No. 725,537. PATENTED APR. 14, 1903.
A. BOLDUC.
BREAD SLICER.
APPLICATION FILED AUG. 23, 1902.
NO MODEL. 3 SHEETS—SHEET 3.
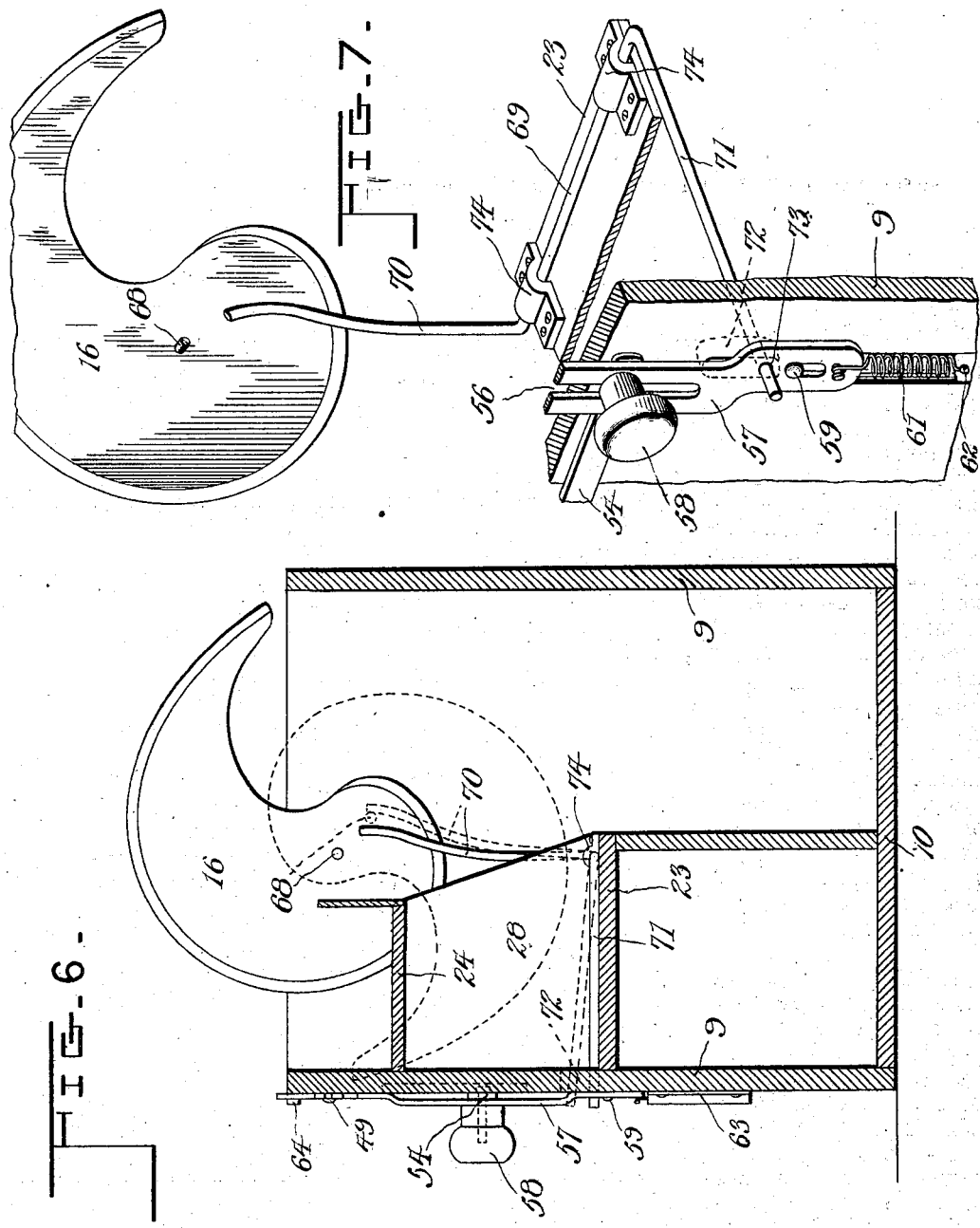
Witnesses:
Jed Page
George W. Colles
Arthur Bolduc, Inventor,
By Marion & Marion
Attorneys

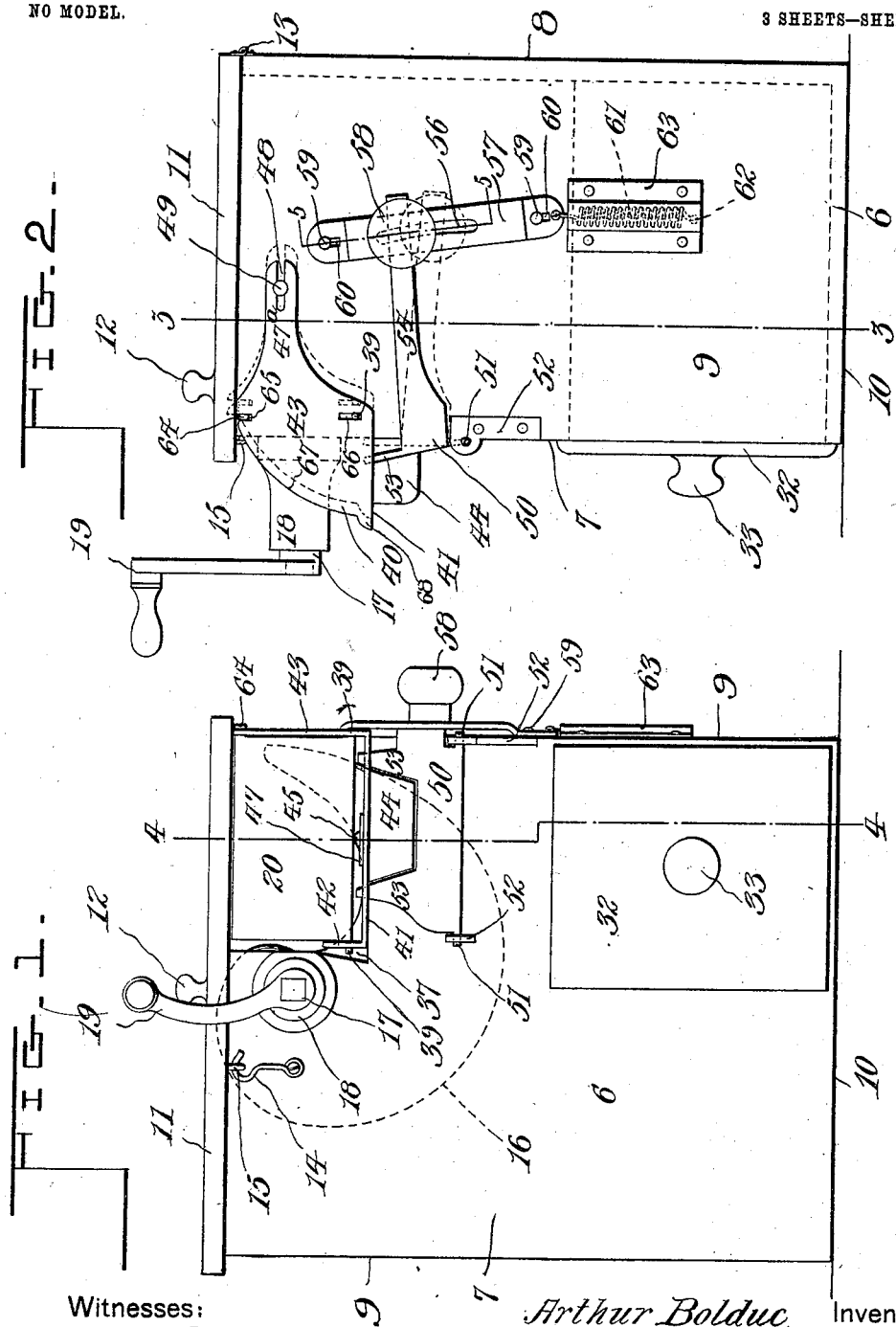

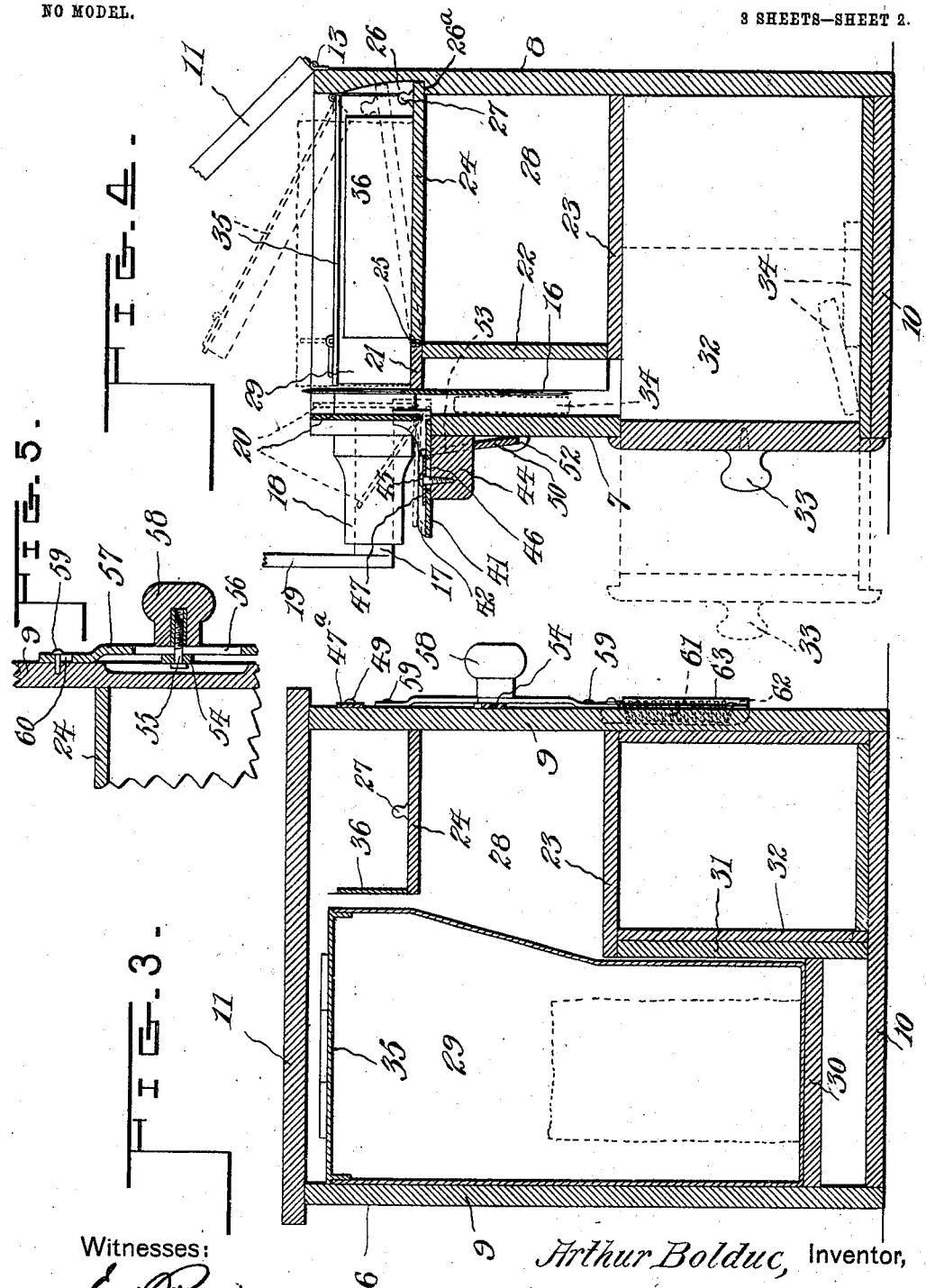

UNITED STATES PATENT OFFICE.

ARTHUR BOLDUC, OF ST. ROCH DE QUEBEC, CANADA.

BREAD-SLICER.

SPECIFICATION forming part of Letters Patent No. 725,537, dated April 14, 1903.

Application filed August 23, 1902. Serial No. 120,752. (No model.)

*To all whom it may concern:*

Be it known that I, ARTHUR BOLDUC, a subject of the King of Great Britain, residing at St. Roch de Quebec, county of Quebec City, (east,) Province of Quebec, Canada, have invented certain new and useful Improvements in Bread-Slicers; and I do hereby declare that the following is a full, clear, and exact description of the invention, such as will enable others skilled in the art to which it appertains to make and use the same.

My invention relates to a compact and handy device for slicing bread, cake, and other like material; and the object that I have in view is to so assemble the parts as to form convenient compartments for holding loaves of bread or cake, for holding slices when cut, and for holding the bread to be cut, and, further, to arrange an adjustable gage whereby to regulate the thickness of the slice.

Another object of my invention is to form the gage to be turned down out of the way when it is desired to cut slices of unusual thickness or else to divide a loaf into several large pieces at any point thereof.

A subordinate object of my invention is to provide means for preventing the compression of the bread between the knife and the gage by providing a resiliency between the two parts which permits one of them to give or yield for a distance equal to the thickness of the knife, which device is particularly useful in the case of partially-dried bread.

To these ends my invention consists in a box having a case on one side adapted to hold uncut loaves and to preserve the same against moisture, a rotary spiral knife adapted to be revolved on one side of the box, a slicing-chamber in which the bread or cake to be sliced is adapted to be located and to be pushed forward against the knife, and a drawer or box into which the slices are adapted to fall and from which they are adapted to be taken.

My invention consists, further, in a gage-plate which is pivotally mounted on a horizontal axis in an adjustable support and is held normally upright, but is adapted to be turned down out of the way when slices of unusual thickness or a large fraction of a loaf is to be cut off at one time. The adjustable mounting of the gage-plate is caused to slide backward and forward independently, so as to regulate the thickness of the slice, and it is attached to a pivoted adjusting-arm which is adapted to be clamped fast to a slotted plate in a variable position thereon, according to the thickness of the slices which it is desired to cut.

My invention consists, further, in providing the said slotted arm with a limited longitudinal movement, being adapted to slide a short distance back and forth in the direction of movement of the pivoted arm itself and being held normally at one end of its movement by a spring, the object of this arrangement being to permit the gage-plate to yield slightly as the knife passes through the bread, whereby to prevent compression of the bread between the knife and gage-plate and to enable it to fall freely into a receiving-drawer or other receptacle placed beneath it and at the same time preventing spoiling of the material for food purposes.

My invention further consists in the construction and combination of parts hereinafter described, and more particularly pointed out in the claims.

I have shown a preferred form of my invention in the accompanying drawings, and wherein—

Figure 1 is a front elevation of my improved bread-slicer. Fig. 2 is a side elevation thereof. Fig. 3 is a vertical section taken at right angles to Fig. 2 and on the line 3 3 thereof. Fig. 4 is a longitudinal vertical section taken on the line 4 4 of Fig. 1. Fig. 5 is a fragmentary detail view on an enlarged scale, showing the adjustable clamping means, being a section on the line 5 5 of Fig. 2. Fig. 6 is a transverse section looking toward the front of an improved form provided with automatic slice-releasing mechanism. Fig. 7 is a detailed perspective view of the slice-releasing mechanism shown in Fig. 6.

The same numerals of reference denote like parts in each of the figures of the drawings.

The bread-slicer consists in the main of a rectangular box or casing 6, which is composed of front and back plates 7 and 8, sides 9, and a bottom plate 10 and is covered on the upper side by a hinged cover-plate 11, having a handle-knob 12, this cover-plate being attached to the back plate 8 by hinges 13, it being secured in closed position to the front plate 7 by any suitable fastening, such as a hook 14, engaging with an eye 15, mounted on the cover. Interiorly of this box and at the front side thereof is mounted a spiral-bladed cutting-knife 16, which is secured fast to the crank-shaft 17 and journaled in a suitable bearing-block 18, fixed to the front plate 7, and whose outer end is provided with a suitable hand-crank 19. This knife is separated by a certain space from the inner side of the front plate 7, this space being equal to or slightly greater than the thickness of the thickest slice that is destined to be cut by the knife with the aid of the adjustable gage-plate 20, to be presently described. At the opposite or rear side of the knife 16 and slightly below the shaft thereof is a loaf-board 21, part of which immediately adjacent to the edge of the knife is supported by a vertical board 22 and a horizontal board 23, secured to the side 9 and rear plate 8 of the cover, and the remaining part of the loaf-board 21 is formed by a lid 24, which is preferably hinged to the stationary portion 21, as shown at 25, and whose free end is seated against a ledge 26ª, formed by a gouge 26 in the inner side of the back plate 8, so as to permit the lid 24 to be raised and lowered, and this lid may be provided at its free end with a lifting-button 27. The chamber 28, formed by the boards 22 23 and the rear plate 8, and of which the board 24 forms the lid, may be utilized for partially-cut loaves and independently of the can 29, which, as shown, is located on the left of the box and is readily removable therefrom. This can is supported, preferably, on a false bottom 30, which connects the left side 9 of the box with an upright partition-board 31, this board serving also to support the inner edge of the board 23 and forming therewith a chamber at the lower right-hand corner of the box, in which is slidably mounted a drawer 32, having a finger-button 33 to enable the same to be pulled out, and this drawer is intended to receive the slices as they are cut, as indicated by dotted lines at 34. The can 29 has a hinged lid 35 at its upper side to enable the loaves to be readily inserted and removed therefrom when the cover 11 has been lifted.

The lid 24 carries, preferably at the inner edge thereof, an upright metal partition-plate 36, attached thereto, so as to guide the loaf in its movement, the distance between the plate 36 and the side 9, to which the lid is adjacent, being about equal to the width of the loaves which are to be cut.

The front board 6 of the box has a square hole 37 cut out of its upper right-hand corner, so as to throw open the interior of the box at this point. Mounted across this open hole 37 is an adjustable gage-plate 20, which is mounted on horizontal pintles 39 at its lower edge in a slidable support 40, this being in the nature of a trough-shaped plate, having a horizontal projecting portion 41 and sides 42 and 43, in which are journaled the pintles 39. The horizontal plate 41 is supported against downward pressure by a bolster-block 44, which is secured to the face of the board 7, and this has a slidable connection with the plate 41 by means of a screw 45, embedded in the bolster-block 44 and passing through a longitudinal slot 46, formed in the plate 41, which slot is covered by a washer 47.

The right side plate 43 of the support 40 is, as shown in Fig. 2, extended upwardly and rearwardly along the outer face of the side plate 9, and it has a backwardly-extending tongue 47ª, which is provided with a longitudinal slot 48, which embraces a pin 49, embedded in the board 9, so that it will be seen that the support 40 has a longitudinal reciprocative movement guided by the slotted connections 46 and 48. The backward-and-forward movement of the support 40 is attained by a pivoted bent plate 50, the body of which is mounted on the front of the board 7 and has pintles 51 journaled in bearing-plates 52, this plate 50 having a pair of upwardly-extending tongues 53 on each side of the bolster-block 44 and extending through slots formed in the horizontal member 41 of the support 40, so that by rocking the plate 50 on its bearings the plate 40 is adjusted back and forth. The plate 50 has a rectangularly-bent arm 54, which extends rearwardly adjacent to the side plate 9 and has on its rear end a small bolt 55, which extends through a slot 56 in a metal strap 57, which is mounted on the side of the board 9. On the outer end of the bolt 55 is mounted a hand-nut 58, by which the arm 54 is clamped in any position on the strap 57 so as to hold the gage 20 at the proper distance from the knife 16. It will be seen that by raising the arm 54 the distance between the gage 20 and the knife 16 is widened, so as to cut thicker slices when the bread is pushed up against the gage-plate. The opposite is the case when the arm 54 is lowered. The slices 34 when cut drop through the open space between the knife and the front board 7 and into the drawer 32, as shown.

The apparatus as thus far described is sufficiently complete to be operative; but I have provided an improvement in order to prevent the slices as cut from being unduly compressed between the plate and the knife owing to the latter having necessarily a certain thickness, which forms a sensible fraction of that of the slice itself. For this reason I provide a limited automatic motion for the gage-plate 20 by means of the following construction: The strap 57 instead of being rigidly mounted on the side 9 of the box is connected therewith by a pair of pins 59, passing through short slots 60 in the ends of the strap, and the lower end of the strap is connected, as shown, to a coiled spring 61, whose other end is fixed at 62 to the board 9, this spring being preferably partially countersunk in the wall 9, as indicated in Fig. 3, and protected by a guard-plate 63. The spring 61 exerts a tension on the strap 57, which draws it to the lower limit of its motion, and thereby holds the gage-plate 20 resiliently in its rearmost position, from which it is not disturbed by the slight endwise pressure of the loaf when brought up against it; but when the knife cuts through the bread the compression caused by the thickness of the knife causes the gage-plate 20 to yield slightly, at the same time raising the arm 54 and the strap 57 against the tension of the spring 61, and thus preventing the bread from being crushed or packed together. This device also facilitates particularly the cutting of dry bread, which is difficultly compressible.

In order to provide for the cutting of thicker slices than usually required or for cutting a large portion—as, for instance, half a loaf at once—the gage-plate 20 is so arranged that it may be turned down out of the way, the pintles 39 being located at such a level that when the plate is turned down into the position shown in dotted lines in Fig. 4 it will be on a level with the loaf-board 21 and will thus form practically a continuation of the loaf-board, so as to permit the loaf to be projected into any position thereon. In this position it is supported by a small projecting lug 68, which is arranged at the proper level for that purpose on the front edge of the side 43 of the support 44 and coacts with a sidewise-extending lug 64 on the gage-plate. The plate 20 is also sustained in its vertical position and prevented from becoming displaced by the sidewise-extending lug 64, which engages in a notch 65, formed in the upper edge of the plate 43, the journal-apertures for the pintles 39 being also formed in the shape of vertical slots 66, as shown in Fig. 2, so as to permit the plate 20 to be raised until the lug 64 is disengaged from the notch 65, when it is free to be turned into horizontal position. The plate 43 has also a cam-shaped curved forward edge 67, which engages the lower edge of the lug 64 when the plate 20 is turned up, and thereby carries it inwardly forward and up until it drops into the notch 65, by which it is retained.

In Figs. 6 and 7 is illustrated the mechanism which I preferably employ for facilitating the discharge of the slice after it has been completely cut through by the knife, and this is effectuated by a slight periodical retraction of the gage-plate 20 from the knife, so as to widen the space and permit the slice to fall as soon as it is cut. This periodical retraction of the gage-plate is caused by an eccentric-pin 68, arranged to project from the rear face of the knife 16 and operating upon the reciprocating strap 57 through a shaft 69, which has a crank 70 formed on one end, which engages with the pin, and another crank 71 formed on its other end, which passes through a slot 72 in the right side wall of the slicer-box and engages with the strap 57 through a hole 73 therein. The shaft 69 is pivotally fixed to the board 23 by means of cleats 74. The cranked end 70 of the shaft is caused to be engaged by the pin 68 just at the time that each slice is cut and is oscillated about its axis into the position shown in dotted lines in Fig. 6, which causes the arm 71 to raise the strap 57, and thus retract the gage-plate 20. This widens the space between the knife and the gage-plate, so as to permit the cut slice to readily drop through, and immediately thereafter the pin 68 passes over the end of the crank 70 and allows the spring 61 to return the gage-plate to its normal position.

While I have shown in the accompanying drawings the preferred form of my invention, it will be understood that I do not limit myself to the precise form shown, for many of the details may be changed in form or position without affecting the operativeness or utility of my invention, and I therefore reserve the right to make all such modifications as are included within the scope of the following claims or of mechanical equivalents to the structures set forth.

Having thus described my invention, what I claim as new, and desire to secure by Letters Patent, is—

1. A bread-slicer comprising a rectangular box or casing, a cover therefor closing its upper side, a bread-receptacle filling one side of said box, a second bread-receptacle at the center of the other side, a loaf-board immediately over said second receptacle and having a part thereof hinged to form a lid for said receptacle, a rotary knife adapted to revolve in a plane adjacent to the forward edge of said loaf-board, and a drawer adapted to receive the cut slices immediately beneath said second receptacle.

2. A bread-slicer comprising a rotatable spiral-bladed knife, a loaf-board having one edge adjacent to the same, a gage-plate mounted adjacent to the other edge and pivoted on hinges at a level with the upper surface of said board, and means for sustaining said gage-plate in vertical position while permitting it to be turned into horizontal position so as to form a continuation of said loaf-board.

3. In a bread-slicer, the combination of a loaf-board, a cutting-knife adapted to revolve adjacent to the edge thereof, a gage-plate mounted on the opposite side of said knife and having a reciprocation toward and from said knife, a pivoted rocking piece engaging with said gage-plate, an arm mounted on said rocking piece, and means for clamping said arm in a definite position.

4. In a bread-slicer, the combination of a loaf-board, a cutting-knife adapted to revolve adjacent to the edge thereof, a gage-plate mounted on the opposite side of said knife and having a reciprocation toward and from said knife, a pivoted rocking piece engaging with said gage-plate, an arm mounted on said rocking piece, a slotted strap mounted across the end of said arm, a bolt passing through the slot of said strap, and a nut mounted on said bolt and adapted to clamp said arm in a definite position on said strap.

5. In a bread-slicer, the combination of a loaf-board, a cutting-knife adapted to revolve adjacent to the edge thereof, a gage-plate mounted on the opposite side of said knife and having a reciprocation toward and from said knife, a pivoted rocking piece engaging with said gage-plate, an arm mounted on said rocking piece, a slotted strap mounted across the end of said arm, a bolt passing through the slot of said strap, a nut mounted on said bolt and adapted to clamp said arm in a definite position on said strap, said strap having a limited reciprocation relative to the stationary parts, and a spring adapted to hold said strap resiliently at one end of its reciprocation, whereby to hold said gage-plate resiliently against the end of the loaf.

6. In a bread-slicer, the combination of a horizontal loaf-board on which the loaf is adapted to be advanced, a rotatable spiral-bladed knife mounted adjacent to the edge of said board and in a plane at right angles thereto, a supporting-plate mounted to have a reciprocation in the line of advancement of the loaf, a gage-plate pivotally mounted on said supporting-plate and adapted to be sustained in a vertical position or to be turned into a horizontal position, a pivoted piece having engagement with said support and adapted to move the same back and forth, an arm attached to said pivoted piece, and means for clamping said arm in a definite position.

7. In a bread-slicer, the combination of a horizontal loaf-board on which the loaf is adapted to be advanced, a rotatable spiral-bladed knife mounted adjacent to the edge of said board and in a plane at right angles thereto, a supporting-plate mounted to have a reciprocation in the line of advancement of the loaf, a gage-plate pivotally mounted on said supporting-plate and adapted to be sustained in a vertical position or to be turned into a horizontal position, a pivoted piece having engagement with said support and adapted to move the same back and forth, an arm attached to said pivoted piece, a metal strap crossing the end of said arm, a bolt mounted on the end of said arm and passing through a slot in said metal strap, a hand-nut mounted on said bolt and adapted to clamp the arm in a definite position on said strap, said strap having a limited independent longitudinal reciprocation in its mounting, and a spring adapted to hold said strap resiliently at one end of its movement such that the gage-plate is held resiliently against the slice, substantially as described.

8. In a bread-slicer, the combination of a loaf-board, a cutting-knife adapted to revolve adjacent to the edge thereof, a gage-plate mounted on the opposite side of said knife and having a reciprocation in the line of advancement of the loaf, a spring resiliently holding said reciprocating gage-plate in the proper position to gage the thickness of a slice, trip mechanism for retracting said gage-plate, and means carried by the knife-shaft and rotating with the knife for operating said trip mechanism to retract the gage-plate after the cutting of each slice, whereby to permit the cut slice to fall readily.

9. In a bread-slicer, the combination of a loaf-board, a cutting-knife adapted to revolve adjacent to the edge thereof, a gage-plate mounted on the opposite side of said knife and having a reciprocation toward and from said knife, a pivoted rocking piece engaging with said gage-plate, an arm mounted on said rocking piece, a spring resiliently retaining the gage-plate in its normal position for regulating the thickness of a slice, a rock-shaft mounted in stationary bearings, a crank-arm carried by one end of said rock-shaft and adapted to oscillate said first-mentioned arm to retract the gage-plate against the action of the spring, a second crank-arm carried by the opposite end of said rock-shaft and extending adjacent to the knife, and an eccentric-pin mounted on the knife adapted to engage said last-mentioned arm at each revolution of the knife to retract said gage-plate, substantially as described.

10. In a bread-slicer, the combination of a loaf-board, a cutting-knife adapted to revolve adjacent to the edge thereof, a gage-plate mounted on the opposite side of said knife, a pivoted rocking piece engaging with said gage-plate, an arm mounted on said rocking piece, a slotted strap mounted across the end of said arm, means for adjustably securing the end of said arm to said strap in various positions thereon according to the thickness of slice desired, mountings to which said strap is secured to permit the longitudinal reciprocation thereof, a spring acting on said strap to hold the gage-plate resiliently in its normal position, a rock-shaft mounted in stationary bearings, a crank-arm carried by said rock-shaft engaging with said strap to reciprocate the same, a second crank-arm also carried by said rock-shaft and extending adjacent to the knife-blade, and an eccentric-pin adapted to engage said second crank-arm at each revolution of the knife and to oscillate the same, whereby to retract the gage-plate after the cutting of each slice, substantially as described.

In witness whereof I have hereunto set my hand in the presence of two witnesses.

ARTHUR BOLDUC.

Witnesses:
L. DION,
ALP LECLERC.